(12) United States Patent
Chandra et al.

(10) Patent No.: US 10,339,485 B2
(45) Date of Patent: Jul. 2, 2019

(54) EFFICIENTLY GENERATING TEST CASES

(71) Applicant: International Business Machines Corporation, Armonk, NY (US)

(72) Inventors: Satish Chandra, Bangalore (IN); Kommineni Vasanta Lakshmi, Bangalore (IN); Nishant Sinha, Bangalore (IN); Saurabh Sinha, Karnataka (IN); Suresh Thummalapenta, Bangalore (IN); Anand Krishna Vaishampayan, Indiranagar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 13/715,206

(22) Filed: Dec. 14, 2012

(65) Prior Publication Data
US 2014/0172512 A1    Jun. 19, 2014

(51) Int. Cl.
*G06Q 10/06* (2012.01)
*G06F 9/46* (2006.01)
(Continued)

(52) U.S. Cl.
CPC .......... *G06Q 10/0637* (2013.01); *G06F 9/44* (2013.01); *G06F 9/46* (2013.01); *G06F 11/3672* (2013.01); *G06F 11/3604* (2013.01)

(58) Field of Classification Search
CPC ......... G06Q 10/0637; G06F 9/44; G06F 9/46; G06F 11/3604; G06F 11/3672
(Continued)

(56) References Cited

U.S. PATENT DOCUMENTS

2008/0072100 A1* 3/2008 Okada ................. G06F 11/3414
714/28
2008/0282219 A1* 11/2008 Seetharaman et al. ....... 717/101
(Continued)

OTHER PUBLICATIONS

A Test Generation Solution to Automate Software Testing, Bouquet et al., AST '08 Proceedings of the 3rd international workshop on Automation of software test, pp. 45-48 (Year: 2008).*

*Primary Examiner* — Timothy Padot
*Assistant Examiner* — Darlene Garcia-Guerra
(74) *Attorney, Agent, or Firm* — Ference & Associates LLC

(57) ABSTRACT

Techniques, an apparatus and computer program product for generating test cases for covering enterprise rules and predicates are disclosed by receiving data associated with at least one of a business requirement and a business scenario as input, wherein the data comprise at least one of a set of predefined rules; based on the data, generating at least one or more test cases as output without any human intervention, wherein the output comprises a test script for the business requirement or the business scenario, and wherein the data associated with the at least one of a business requirement and a business scenario comprise at least one of a business rule, business requirement and predicate, the data associated with the at least one of business requirement and business scenario are stored as a linked graph in a repository, and wherein each node of the linked graph is mapped to previously stored data in the repository, wherein the repository comprises either one of a structured or unstructured data, and the data are obtained from the requirement specifications.

16 Claims, 3 Drawing Sheets

(51) Int. Cl.
*G06F 11/36* (2006.01)
*G06F 9/44* (2018.01)

(58) Field of Classification Search
USPC ............ 705/7.37; 714/33; 717/124; 718/105
See application file for complete search history.

(56) References Cited

U.S. PATENT DOCUMENTS

| | | | |
|---|---|---|---|
| 2009/0178021 A1* | 7/2009 | Alluri | 717/104 |
| 2009/0192849 A1* | 7/2009 | Hughes et al. | 705/7 |
| 2009/0327196 A1* | 12/2009 | Studer | G06F 8/00 706/47 |
| 2010/0037210 A1* | 2/2010 | Okada | 717/125 |
| 2010/0180256 A1* | 7/2010 | Gorthi et al. | 717/124 |
| 2011/0208501 A1* | 8/2011 | Yeolekar et al. | 703/13 |
| 2012/0017200 A1* | 1/2012 | Ghosh et al. | 717/126 |
| 2012/0066550 A1* | 3/2012 | Keum et al. | 714/38.1 |
| 2012/0254665 A1* | 10/2012 | Pasala et al. | 714/33 |
| 2013/0117611 A1* | 5/2013 | Chakraborty | G06F 11/3672 714/33 |
| 2013/0239092 A1* | 9/2013 | Wieczorek et al. | 717/126 |

\* cited by examiner

EFFICIENTLY GENERATING TEST CASES

FIELD OF THE INVENTION

Embodiments of the invention in general relate to the field of information technology including software and hardware, and, more particularly addresses the issue of efficiently generating test cases.

BACKGROUND

Applications typically have complex logic that govern their behavior, and the complexity manifests itself in many different ways. For instance, the complexity may show up as complicated and numerous navigation paths in the application user interface, as significant interactions between data entered on different application screens, or as complex rules related to access control, business calculations, etc. Functional specification of applications is often given in the form of rules, which for example can describe the logic, access control, or navigational properties of an application's graphical user interface (GUI). Therefore, these rules can be considered as a natural starting point for the design of functional tests.

The aim of functional testing of applications is to exercise meaningful or interesting application behavior. Although testing can be guided to cover navigation paths, exhaustive coverage is impractical in most cases, as applications can have a prohibitively large numbers of paths. Moreover, such testing can be wasteful because not all paths exercise interesting application behavior. Instead, it can be more fruitful for functional testing of enterprise applications to be directed toward covering use cases, enterprise rules, or selected combinations of values for different application parameters.

For example, in an online shopping application, different parameters such as invoice amount and payment method can interact to determine some enterprise calculation such as the offer of a discount or a gift coupon. Thus, testing can be directed to covering different combinations of values for these parameters (or predicates).

Creating a test that covers a rule presents challenges, however. Such a task requires identification of a potentially complex sequence of actions (on the application user interface) along with suitable data values. In existing approaches, this is performed manually, and therefore, is both expensive in human time and subject to errors of omission that can lead to inadequate testing. Hence, there is a need for an automated methodology for test generation from enterprise rules and predicates.

SUMMARY

In summary, one aspect of the invention provides a method comprising: receiving data associated with at least one of a business requirement and a business scenario as input, wherein the data comprise at least one of a set of predefined rules; and based on the data, generating at least one or more test cases as output without any human intervention, wherein the output comprises a test script for the business requirement or the business scenario.

Another aspect of the invention provides a system comprising at least a processor and a memory, the system configured for creation of test cases, wherein the system receives data associated with at least one of a business requirement and a business scenario as input, wherein the data comprise at least one of a set of predefined rules; and based on the data generating at least one or more test cases as output without any human intervention, wherein the output comprises a test script for the business requirement or the business scenario, A further aspect of the invention provides a computer program product in a non-transitory computer-readable storage medium for use in a data processing system, the computer program product holding computer program instructions which, when executed by the data processing system perform a method for test case creation, the method comprising: receiving data associated with at least one of a business requirement and a business scenario as input, wherein the data comprise at least one of a set of predefined rules; based on the data generating at least one or more test cases as output without any human intervention, wherein the output comprises a test script for the business requirement or the business scenario, and wherein the data associated with the at least one business requirement and a business scenario comprise at least one of a business rule, business requirement and predicate.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
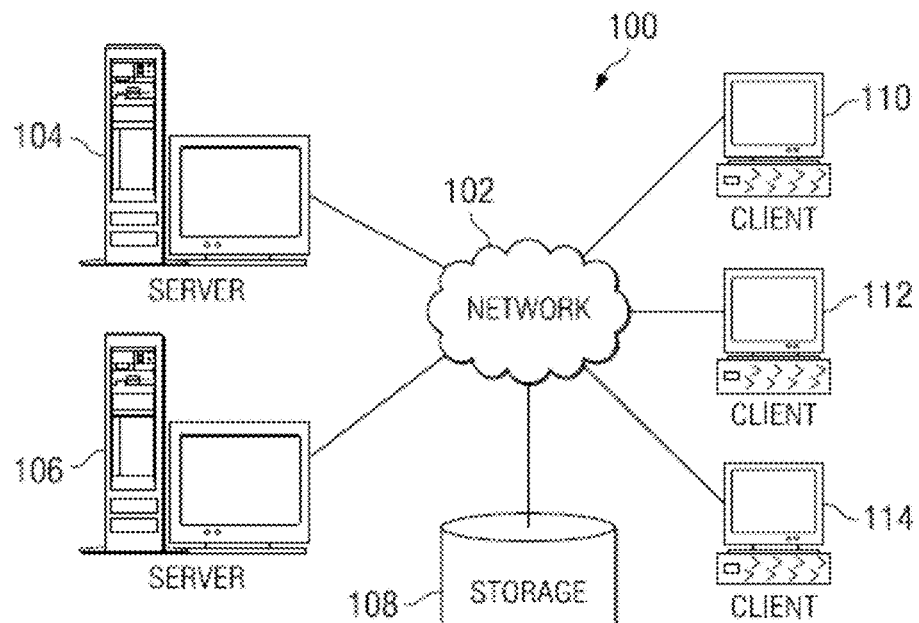
FIG. 1 depicts an exemplary block diagram of a distributed data processing environment in which exemplary aspects of the illustrative embodiments may be implemented.
Figure 2:
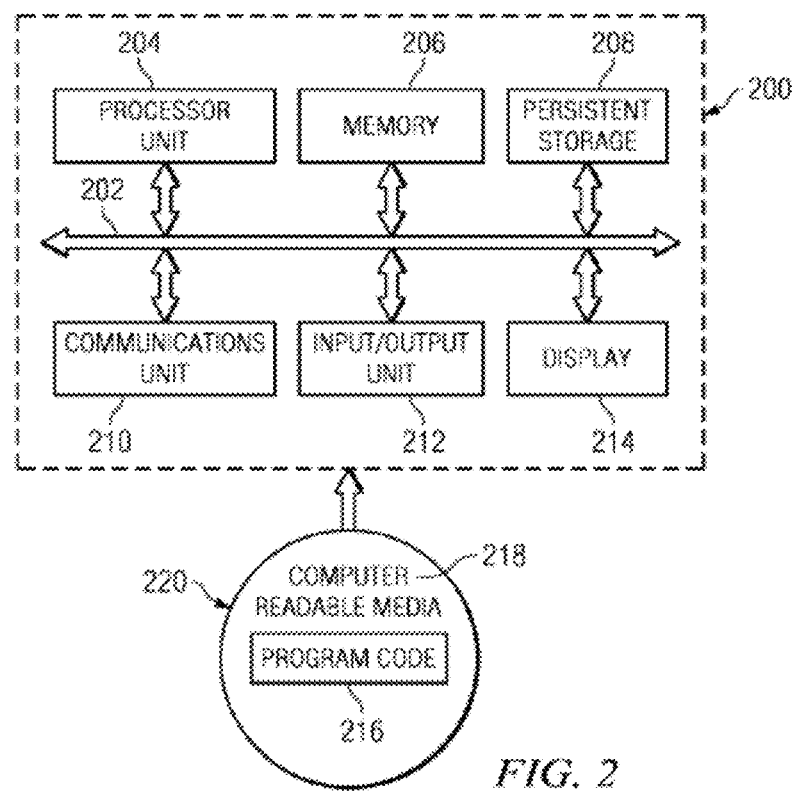
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As described herein, an embodiment of the invention includes generating test cases for covering enterprise rules and predicates, for example, from a requirement specification document, wherein once the document is input, rules and predicates are determined, the system is configured to automatically crawl the web (www) and any other repository containing structured or unstructured data, which can be mapped to the requirement specifications of the document.

Figure 3:
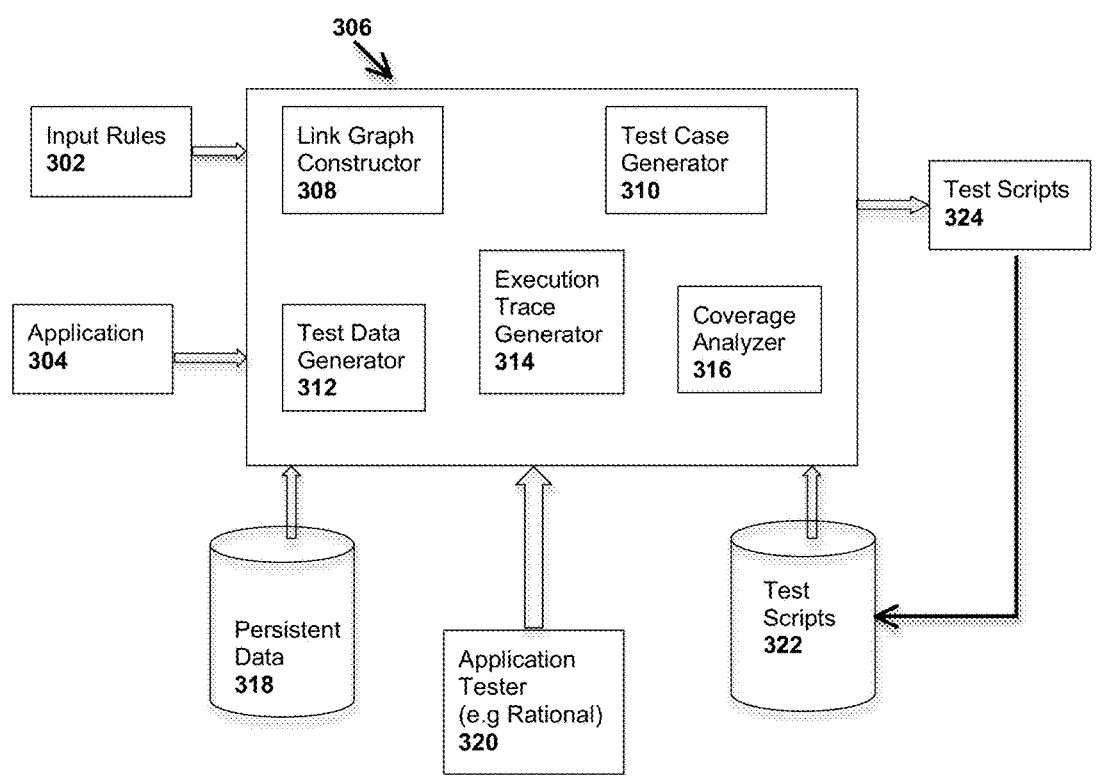
FIG. 3 is an exemplary system component according to an embodiment of the invention.

FIG. 3 is an exemplary system component according to an embodiment of the invention. By way of illustration, FIG. 3 depicts enterprise rules 302 and an application 304 being provided to system 306, which includes a link graph constructor component 308, a test case generator component 310, a test data generator component 312, an execution trace generator component 314 and a coverage analyzer component 316. Also provided to system 306 is persistent data 318. As also depicted in FIG. 3, system 306 outputs test scripts 324, which can be provided to a test scripts database 322, which also in one embodiment interacts with system 306. Further, system 306 provides output to a rational function tester component 320.

As detailed herein, at least one embodiment of the invention includes test case generation for covering enterprise rules. At a high level, the coverage of a rule r requires the traversal of a specific path $\Pi_{ant}$ to trigger the antecedent of r, and the traversal of another specific path $\Pi_{cons}$ from $\Pi_{ant}$ to observe all consequent variables of r (while checking that the invariants of r are not violated along $\Pi_{cons}$). Thus, a test generation technique as detailed herein includes discovering the path $\Pi_{cov}=(\Pi_{ant}\cdot\Pi_{cons})$.

Accordingly, at least one embodiment of the invention includes performing a guided exploration that is directed, via a link graph, toward a set of pages that are relevant for observing the antecedent and consequent variables of a rule. A link graph (LG) is a directed graph in which nodes represent (server-side) application pages and edges represent possible navigations among the actual (hypertext markup language (HTML)) instances of these pages.

At least one embodiment of the invention includes iteratively exploring all candidate paths in the link graph that cover target pages relevant to a rule. In general, the candidate paths can be significantly fewer than the total number of paths in the application, which reduces the scope of the search for $\Pi_{cov}$. For each edge in a candidate path, there can be multiple actionable elements such that choosing different elements could generate different results. At least one embodiment of the invention addresses these challenges via a backtracking algorithm that aims to explore multiple candidate paths simultaneously. To increase efficiency, while covering a rule, aspects of the invention include reusing paths (or their prefixes) that were exercised during the exploration of previous rules.

Mechanical construction of the LG, via automatic static or dynamic analysis of the application, can pose a challenge because of the heterogeneous and highly dynamic nature of web applications. A typical application is implemented using a combination of dynamic languages and technologies. Moreover, an application may have a very high degree of dynamism.

Accordingly, static analysis deals with the challenges posed by heterogeneity and dynamism to construct link graphs. For instance, it may be challenging to statically compute the navigation edges that are exposed only during dynamic execution (for example, links embedded in JavaScript code or links traversed due to page redirection). As such, at least one embodiment of the invention includes performing an analysis that, under certain assumptions, computes an over-approximate link graph. The statically constructed LG is referred to herein as the static link graph (SLG). The analysis performs a shallow scan of server-side JavaServer Pages (JSP) files to discover references and inclusions of other JSP files, and adds corresponding edges in the SLG. To ensure that the SLG indeed over-approximates the precise LG, the analysis assumes that all the files referenced by a navigation request from (HTML instances of) a particular file are explicitly mentioned in the file.

Alternatively, as detailed herein, the LG can be constructed by dynamically exploring an application (for example, to cover actionable elements). Such a graph is referred to herein as a dynamic link graph (DLG). The DLG under-approximates the precise LG because it may not consider all ways to reach a particular web page and, therefore, may miss navigation options from that page. However, because the DLG contains precise navigation edges, the DLG provides valuable guidance about link targets that are difficult to identify statically; thus, the DLG can speed up the analysis.

A DLG is constructed, in at least one embodiment of the invention, by exploring all navigational elements, iteratively, starting from the root HTML page of the application in a breadth-first manner. After exploring all elements in the root page, the construction techniques descend to new pages that are encountered, and the process is repeated for all unexplored navigational elements on that page.

To scale DLG construction to realistic applications, pruning can be performed. For instance, a page is considered new if its uniform resource locator (URL) is explored for the first time (without regards to the application state). If a navigational element e (a link or button) within a page is similar to another previously explored element e' in the page, e is not explored further. Two elements are considered similar if they are of the same type (for example, a link or submit button), and they result in the HTML pages generated from the same server-side script. DLG construction needs to be performed only once for an application. Moreover, DLG construction can disambiguate actionable elements and has wide applicability across different server-side scripting technologies.

As detailed herein, at least one embodiment of the invention also includes test data generation. In general, the form submit actions require input test data to successfully execute the action. At least one embodiment of the invention includes generating the necessary data for editable elements via (a) solving constraints present in rules or provided by user separately, (b) reusing data from previous explorations, (c) using persistent storage data (for example, for log-in, password fields, etc.), or (d) randomly generated data.

Figure 4:
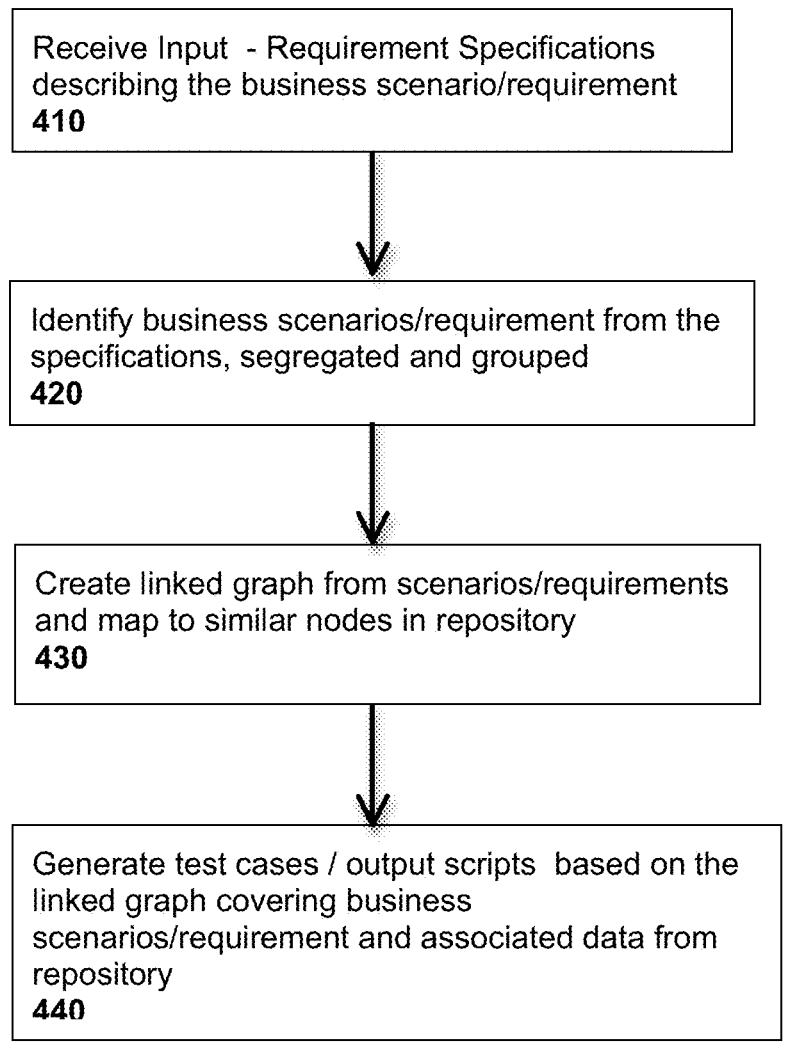
FIG. 4 is a flow diagram illustrating techniques for automated test case generation for a web application, according to an embodiment of the invention.

FIG. 4 illustrates an exemplary flowchart of the method in accordance with the invention. In step 410, once the requirement specifications are gathered, they are input into a system, wherein the requirement specifications contain/include a number of business scenarios or business requirements, and each of these business scenarios/requirements are broken down as pre-defined rules to generate test cases. In step 420 each of the business requirement or business scenarios or predicates also referred to herein as predefined rules are identified and segregated and grouped to identify similar requirements or scenarios. In step 420 a linked graph is created from these predefined rules and the nodes created in the linked graph are linked to nodes in a repository by mapping the rules or requirements of each node with a similar node in the repository. Each sub node of the linked graph created is then connected to the main node and in the repository. If there exists another node or sub node in the repository, then a link is created between the new sub node and the older sub node in the repository, thereby creating a new path, tree path, which can be used for generating new test scripts.

In step 440, once the linked graph created from the data received, for example the requirement specifications, and mapped with the nodes of the graphs in the repository, for each rule or requirement, a number of test cases can be automatically generated from the traversal path in the repository, thereby covering almost all possible test cases and optimizing the test cases for the specific business requirements. In one embodiment, human intervention can be sought to modify or refine the test cases that are output from the system.

For example, functional specification of enterprise applications is often given in the form of business rules/requirements. Business rules describe business logic, access control, or even navigational properties for an application. Therefore, business rules can be associated as the natural starting point for the design of functional tests. Embodiments of the invention disclose a technique for automatically generating tests that drive an application along paths in which business rules apply (are "covered"), so that the application's conformance to relevant business rules can be tested. The technique is black box, in that it does not analyze the application's server-side implementation. Rather, in one embodiment, it performs a guided search through the network of interconnected pages that are created dynamically by the server-side scripts and delivered to the browser. The guided search is much more effective at covering business rules, compared to an unguided search as carried out by a typical web crawler; and experiments showed about 91% of the rules were covered as opposed to the conventional methodology where only about 43% rules covered.

Additionally, the techniques depicted in FIG. 3 and FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon. An aspect of the invention or elements thereof can be implemented in the form of an apparatus including a memory and at least one processor that is coupled to the memory and operative to perform exemplary method steps.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. At least one aspect of the present invention may provide a beneficial effect such as, for example, improving the effectiveness and efficiency of functional testing of web applications via automated creation of executable test cases.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for test case creation, the method comprising:
utilizing at least one processor to execute computer code configured to perform the steps of:
generating at least one test case for testing an application, wherein the application comprises a web-based application and wherein the generating comprises:
receiving, as input, data corresponding to an application, wherein the data further comprises at least one of a business requirement and a business scenario as at least one of a set of predefined rules;
generating a link graph based upon the data, wherein the link graph comprises nodes representing pages of the application and edges representing possible navigations between pages of the application, wherein traversal of a path through nodes and edges of the link graph triggers an antecedent of one of the set of predefined rules and identifies consequent variables of the one of the set of predefined rules;
the generating a link graph comprising generating a static link graph and a dynamic link graph, wherein the static link graph identifies files referenced or included in the files of the application related to the one of the set of predefined rules and are identified from a shallow scan of the pages of the application and wherein the dynamic link graph is generated by dynamically exploring navigational elements within the application and identifies navigation edges and corresponding pages of the application within the application;
storing the link graph in a repository, wherein each node of the link graph is mapped to previously stored data in the repository, wherein the previously stored data comprises at least one rule corresponding to the at least one of a set of predefined rules; and
using the link graph, generating at least one or more test cases for the application as output, wherein the output comprises a test script for the application that conforms to the at least one of the business requirement and the business scenario, wherein the generating comprises identifying at least one path through the link graph that covers the at least one of a set of predefined rules and driving testing of the application along the at least one path; and
testing the web-based application by implementing the generated at least one test case.

2. The method as claimed in claim 1, wherein the data associated with the at least one business requirement and a business scenario comprise at least one of a business rule, business requirement, and predicate.

3. The method as claimed in claim 1, wherein the repository comprises either one of structured or unstructured data.

4. The method as claimed in claim 1, wherein the data are obtained from the requirement specifications.

5. The method as claimed in claim 1, wherein the data are mapped with historical data available in the public domain to create nodes in the link graph.

6. The method as claimed in claim 1, wherein the data include an antecedent, a consequent, and one or more invariant conditions.

7. The method as claimed in claim 6, wherein the antecedent, the consequent, and the one or more invariant conditions are stated in a vocabulary of one or more enterprise rule variables.

8. A system comprising at least a processor and a memory, the system configured for creation of test cases, wherein the system:
generates at least one test case for testing an application, wherein the application comprises a web-based application and wherein the system in generating:
receives, as input, data corresponding to an application, wherein the data further comprises at least one of a business requirement and a business scenario as at least one of a set of predefined rules;
generates a link graph based upon the data, wherein the link graph comprises nodes representing pages of the application and edges representing possible navigations between pages of the application, wherein traversal of a path through nodes and edges of the link graph triggers an antecedent of one of the set of predefined rules and identifies consequent variables of the one of the set of predefined rules;
the generating a link graph comprising generating a static link graph and a dynamic link graph, wherein the static link graph identifies files referenced or included in the files of the application related to the one of the set of predefined rules and are identified from a shallow scan of the pages of the application and wherein the dynamic link graph is generated by dynamically exploring navigational elements within the application and identifies navigation edges and corresponding pages of the application within the application;
storing the link graph in a repository, wherein each node of the link graph is mapped to previously stored data in the repository, wherein the previously stored data comprises at least one rule corresponding to the at least one of a set of predefined rules; and
using the link graph, generating at least one or more test cases for the application as output, wherein the output comprises a test script for the application that conforms to the at least one of the business requirement and the business scenario, wherein the generating comprises identifying at least one path through the link graph that covers the at least one of a set of predefined rules and driving testing of the application along the at least one path; and
tests the web-based application by implementing the generated at least one test case.

9. The system as claimed in claim 8, wherein the data associated with the at least one business requirement and a business scenario comprise at least one of a business rule, business requirement, and predicate.

10. The system as claimed in claim 8, wherein the repository comprises either one of structured or unstructured data.

11. The system as claimed in claim 8, wherein the data are obtained from the requirement specifications.

12. The system as claimed in claim 8, wherein the data are mapped with historical data available in the public domain to create nodes in the link graph.

13. The system as claimed in claim 8, wherein the data include an antecedent, a consequent, and one or more invariant conditions.

14. The system as claimed in claim 13, wherein the antecedent, the consequent, and the one or more invariant conditions are stated in a vocabulary of one or more enterprise rule variables.

15. A computer program product in a non-transitory computer-readable storage medium for use in a data processing system, the computer program product holding computer program instructions which, when executed by the data processing system perform a method for test case creation, the method comprising:

generating at least one test case for testing an application, wherein the application comprises a web-based application and wherein the generating comprises:

receiving, as input, data corresponding to an application, wherein the data further comprises at least one of a business requirement and a business scenario as at least one of a set of predefined rules, wherein the data associated with the at least one business requirement and a business scenario comprise at least one of a business rule, business requirement and predicate;

generating a link graph based upon the data, wherein the link graph comprises nodes representing pages of the application and edges representing possible navigations between pages of the application, wherein traversal of a path through nodes and edges of the link graph triggers an antecedent of one of the set of predefined rules and identifies consequent variables of the one of the set of predefined rules;

the generating a link graph comprising generating a static link graph and a dynamic link graph, wherein the static link graph identifies files referenced or included in the files of the application related to the one of the set of predefined rules and are identified from a shallow scan of the pages of the application and wherein the dynamic link graph is generated by dynamically exploring navigational elements within the application and identifies navigation edges and corresponding pages of the application within the application;

storing the link graph in a repository, wherein each node of the link graph is mapped to previously stored data in the repository, wherein the previously stored data comprises at least one rule corresponding to the at least one of a set of predefined rules and wherein the repository comprises either one of structured or unstructured data; and using the link graph, generating at least one or more test cases for the application as output without any human intervention, wherein the output comprises a test script for the application that conforms to the at least one of the business requirement and the business scenario, wherein the generating comprises identifying at least one path through the link graph that covers the at least one of a set of predefined rules and driving testing of the application along the at least one path; and testing the web-based application by implementing the generated at least one test case.

16. The computer program product as claimed in claim 15, wherein the data are obtained from the requirement specifications, and wherein the data are mapped with historical data available in the public domain to create nodes in the link graph.

* * * * *